(12) United States Patent
Nagao

(10) Patent No.: US 9,175,958 B2
(45) Date of Patent: Nov. 3, 2015

(54) ELECTRONIC LEVEL

(75) Inventor: Takashi Nagao, Kanagawa (JP)

(73) Assignee: Sokkia Topcon Co., Ltd., Tokyo (JP)

( * ) Notice: Subject to any disclaimer, the term of this patent is extended or adjusted under 35 U.S.C. 154(b) by 613 days.

(21) Appl. No.: 13/519,659

(22) PCT Filed: Mar. 24, 2010

(86) PCT No.: PCT/JP2010/055066
§ 371 (c)(1),
(2), (4) Date: Jun. 28, 2012

(87) PCT Pub. No.: WO2011/099171
PCT Pub. Date: Aug. 18, 2011

(65) Prior Publication Data
US 2012/0285027 A1    Nov. 15, 2012

(30) Foreign Application Priority Data

Feb. 10, 2010   (JP) .................................. 2010-027514

(51) Int. Cl.
*G01C 9/02*       (2006.01)
*G01C 5/00*       (2006.01)
*G01C 15/00*      (2006.01)
*G01C 15/06*      (2006.01)

(52) U.S. Cl.
CPC ................ *G01C 5/00* (2013.01); *G01C 15/006* (2013.01); *G01C 15/06* (2013.01); *G01C 9/02* (2013.01)

(58) Field of Classification Search
CPC ............ G01C 9/02; G01C 15/06; G01C 5/00; G01C 15/006

USPC ............ 33/293–296, 809–812, 370, 354, 228
See application file for complete search history.

(56) References Cited

U.S. PATENT DOCUMENTS 1,428,669 A * 9/1922 Watson ........................... 33/295
3,970,391 A * 7/1976 Johnson et al. ............. 356/141.3
(Continued)

FOREIGN PATENT DOCUMENTS

| JP | 7-311036 A | 11/1995 |
| JP | 8-210854 A | 8/1996 |
| JP | 11-30517 A | 2/1999 |

OTHER PUBLICATIONS

International Search Report PCT/JP2010/055066 mailed on Apr. 22, 2010.

*Primary Examiner* — R. A. Smith
*Assistant Examiner* — Tania Courson
(74) *Attorney, Agent, or Firm* — Roberts Mlotkowski Safran & Cole, PC

(57) ABSTRACT

Provided is an electronic level capable of accurately measuring a height difference between two points even when a waving method of finding and determining as a measured height a minimum value of read heights while rocking a leveling rod back and forth is used. An electronic level includes leveling rod reading-in means (S2) which reads graduations on a leveling rod being rocked back and forth and stores read heights, and stores the time of reading, approximate function determining means (S3) which approximates the read heights read in by the leveling rod reading-in means by a quadratic function of time, and measured value calculating means (S4) which determines a minimum value of the quadratic function approximated by the approximate function determining means as a measured height.

6 Claims, 4 Drawing Sheets

(56) References Cited

U.S. PATENT DOCUMENTS

| | | | |
|---|---|---|---|
| 4,023,908 A * | 5/1977 | Johnson et al. | 356/141.3 |
| 4,030,832 A * | 6/1977 | Rando et al. | 356/4.08 |
| 4,693,598 A * | 9/1987 | Sehr | 356/4.08 |
| 4,715,714 A * | 12/1987 | Gaechter et al. | 356/617 |
| 6,108,920 A * | 8/2000 | Kinoshita | 33/293 |
| 6,167,629 B1 * | 1/2001 | Chiba | 33/293 |
| 6,573,981 B2 * | 6/2003 | Kumagai et al. | 356/4.08 |
| 6,657,734 B1 * | 12/2003 | Monz et al. | 356/601 |
| 6,907,133 B2 * | 6/2005 | Gotoh | 382/106 |
| 6,960,749 B1 * | 11/2005 | Nakamura | 250/201.2 |
| 7,110,092 B2 * | 9/2006 | Kasper et al. | 356/4.01 |
| 7,373,725 B1 * | 5/2008 | Vanneman et al. | 33/293 |
| 7,506,452 B1 * | 3/2009 | Vanneman et al. | 33/293 |
| 7,644,505 B2 * | 1/2010 | Zeng et al. | 33/293 |
| 7,788,815 B2 * | 9/2010 | Yandrick et al. | 33/294 |
| 8,510,964 B2 * | 8/2013 | Nagao | 33/293 |
| 8,539,685 B2 * | 9/2013 | Amor | 33/290 |
| 8,881,413 B2 * | 11/2014 | Nagao et al. | 33/293 |
| 2014/0338206 A1 * | 11/2014 | Kahle | 33/228 |
| 2014/0360031 A1 * | 12/2014 | Kahlow | 33/228 |

* cited by examiner

ELECTRONIC LEVEL

TECHNICAL FIELD

The present invention relates to an electronic level (electronic leveling instrument), and more particularly, to an electronic level capable of measuring a height difference between two points by a waving method.

BACKGROUND ART

For measuring a height difference between two points at a high accuracy, measurement has been performed by mounting a round bubble vial on a leveling rod, an operator holding the leveling rod vertically while observing the round bubble vial, and another operator reading the graduations on the leveling rod by a level. On the other hand, at the time of survey operation, not only has it been necessary to mount the round bubble vial on the leveling rod every time for measurement, but there has also been a troublesome operation, such that accuracy confirmation of the round bubble vial using a plumb bob or the like is also required. Therefore, as shown in FIG. 1, a measuring method called a waving method in which an operator finds and determines as a measured value the minimum reading of the graduations on the leveling rod 2 while rocking the leveling rod 2 back and forth toward the level 1 without mounting a round bubble vial on the leveling rod 2 has also been commonly performed.

Meanwhile, in recent years, electronic levels that allow automatic reading of the graduations on the leveling rods have also appeared. The electronic level is a level structured so as to allow automatic reading of the graduations by using a leveling rod with a barcode as the graduations. However, at present, no electronic levels compatible with the waving method are available, which has been one of the obstacles hindering the spread of electronic levels.

To respond to such a situation, the following patent literature 1 discloses an electronic level compatible with the waving method.

The electronic level disclosed in the following patent literature 1 will be described based on FIG. 5. With this electronic level, the shoe of a leveling rod 2 is fixed to a measuring point, an image S of the leveling rod 2 is projected onto a two-dimensional sensor 17 while the leveling rod 2 is rocked back and forth toward the electronic level. Then, by scanning the image S along a scanning line CT parallel to the Y-axis, a signal waveform Z according to a graduation pattern drawn on the leveling rod 2 is obtained. The signal waveforms Z obtained at a predetermined sampling cycle have changes in the signal waveform Z as shown in FIG. 5 (a), (b), and (c). The position on the scanning line CT of an identifying point P on the leveling rod 2 is determined from these signal waveforms Z, and when the identification point P has moved most to one side (side corresponding to a higher position of the leveling rod 2) on the scanning line CT, a graduation pattern on the leveling rod 2 captured by a two-dimensional sensor 17 is stored in an image memory (not shown). Here, by reading images of the graduation patterns stored in the image memory, a height difference between two points can be measured.

CITATION LIST

Patent Literature

Patent Literature 1: Japanese Published Unexamined Patent Application No. H11-30517

SUMMARY OF INVENTION

Technical Problem

On the other hand, in the electronic level disclosed in the above patent literature 1, there has been a problem that, for performing the waving method, an image of the leveling rod 2 at a moment the leveling rod has become perfectly vertical cannot be obtained unless the sampling cycle to obtain a signal waveform Z is sufficiently short, and thus an error occurs. However, since a certain amount of time is required for processing an image projected onto the two-dimensional sensor 17, there has been a limit in shortening the sampling cycle. Moreover, there has also been a problem that since the graduation pattern drawn on the leveling rod 2 contains similar shapes, sight of the identifying point P on the leveling rod 2 may be lost to fail in measurement.

The present invention has been made in view of the problems described above, and an object thereof is to provide an electronic level capable of accurately measuring a height difference between two points even when a waving method is used.

Solution to Problem

In order to achieve the above-described object, an electronic level according to a first aspect of the present invention includes leveling rod reading-in means which reads at a predetermined cycle graduations on a leveling rod being rocked back and forth and stores read heights, approximate function determining means which approximates the read heights read in by the leveling rod reading-in means by a polynomial of time, and measured value calculating means which determines a minimum value of the polynomial approximated by the approximate function determining means as a measured height.

An electronic level according to a second aspect of the present invention includes leveling rod reading-in means which reads graduations on a leveling rod being rocked back and forth and stores read heights, and stores time of reading, approximate function determining means which approximates the read heights read in by the leveling rod reading-in means by a polynomial of time, and measured value calculating means which determines a minimum value of the polynomial approximated by the approximate function determining means as a measured height.

An electronic level according to a third aspect of the present invention is the first or second aspect of the present invention, in which the polynomial is a quadratic function.

An electronic level according to a fourth aspect of the present invention is the first, second, or third aspect of the present invention, including average calculating means which obtains a plurality of measured heights and calculates an average.

An electronic level according to a fifth aspect of the present invention is the fourth aspect of the present invention, includes average determining means which calculates dispersion of the measured heights, and determines the average to be erroneous when the dispersion is a predetermined value or more.

Advantageous Effects of Invention

According to the first aspect of the present invention, the electronic level includes leveling rod reading-in means which reads at a predetermined cycle graduations on a leveling rod being rocked back and forth and stores read heights, approximate function determining means which approximates the read heights read in by the leveling rod reading-in means by a polynomial of time, and measured value calculating means which determines a minimum value of the polynomial approximated by the approximate function determining means as a measured height, and thus an accurate measurement height can be obtained even if a measured height at a moment the leveling rod has become perfectly vertical cannot be obtained. Moreover, the electronic level is economical with a simple modification to only slightly rewrite the program of a built-in CPU of a conventional electronic level.

According to the second aspect of the present invention, the electronic level includes leveling rod reading-in means which reads graduations on a leveling rod being rocked back and forth and stores read heights, and stores time of reading, approximate function determining means which approximates the read heights read in by the leveling rod reading-in means by a polynomial of time, and measured value calculating means which determines a minimum value of the polynomial approximated by the approximate function determining means as a measured height, and thus the same effects as those of the first aspect of the present invention can be obtained.

According to the third aspect of the present invention, further, the polynomial is a quadratic function, and thus an accurate measured height can be obtained quickly.

According to the fourth aspect of the present invention, the electric level further includes average calculating means which obtains a plurality of measured heights and calculates an average, and thus a more accurate measured height can be obtained.

According to the fifth aspect of the present invention, the electric level further includes average determining means which calculates dispersion of the measured heights, and determines the average to be erroneous when the dispersion is a predetermined value or more, and thus unreliable measured values that are greatly dispersed can be excluded.

DESCRIPTION OF EMBODIMENTS

Hereinafter, an embodiment of an electronic level of the present invention will be described based on FIG. 1 to FIG. 4. Electronic levels include one that is capable of performing a height measurement and a distance measurement by a stadia survey successively and speedily. In such an electronic level, a measurement by the waving method is enabled by slightly improving the program of a built-in CPU.

Figure 1:
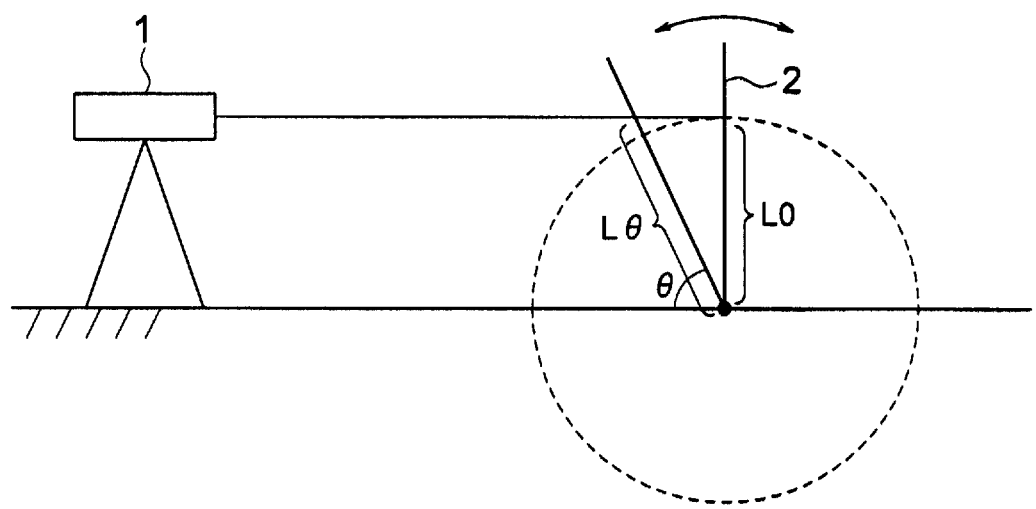
FIG. 1 is a view for explaining a measuring method called a waving method.

As can be understood from FIG. 1, in the level 1, a read value L0 of an accurate height is obtained when the leveling rod 2 is vertical, but when the leveling rod 2 has an inclination angle θ, a read value Lθ larger than the accurate height is obtained. In this regard, the following formula holds between Lθ and L0.

$$L\theta = L0/\sin\theta \tag{1}$$

Figure 2:
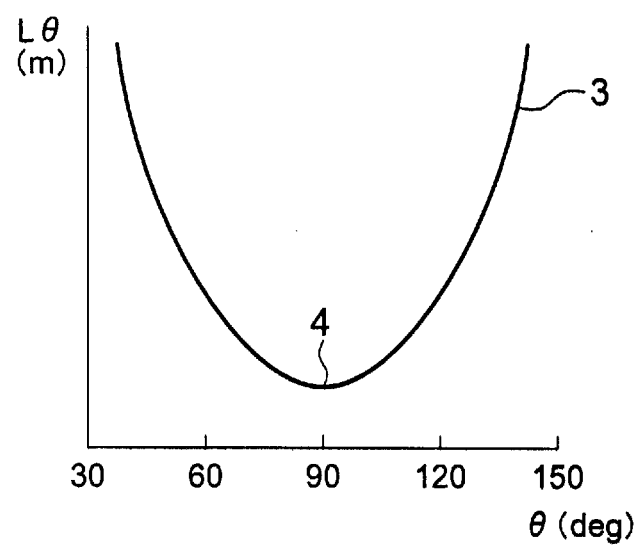
FIG. 2 is a graph showing a relationship between the inclination angle of a leveling rod and read height.

When the relationship between the inclination angle θ and the read height Lθ is graphed from formula (1), a curve 3 as shown in FIG. 2 is obtained. Here, a minimum value 4 of the read height Lθ is the most accurate measured height. The curve 3, which is accurately expressed by formula (1), can be approximated by a polynomial (rational integral function) such as a quadratic function if limited to the vicinity of the minimum value 4 of the read height Lθ. If the leveling rod 2 can be rocked at a fixed angular velocity, the same curve is obtained even when the inclination angle θ is changed to time.

Figure 3:
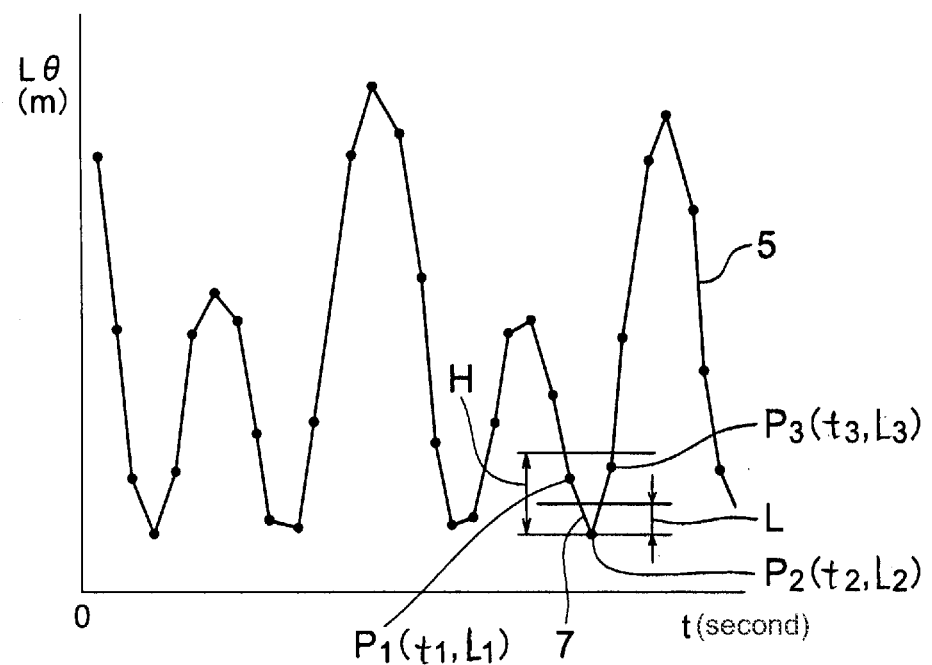
FIG. 3 is a graph showing a relationship between the time and read height when a waving method is used.

Therefore, when the leveling rod 2 is rocked a plurality of times, and the relationship between the time t and the read height Lθ is graphed, a curve 5 as shown in FIG. 3 is obtained. Here, a plurality of measured heights are obtained by approximating a vicinity 7 of the minimum value of a bottom of the curve 5 by a quadratic function, using read heights Lθ of three points P1, P2, P3 in the vicinity 7 of the minimum value of the bottom of the curve 5, and obtaining a minimum value of the quadratic function. Then, by taking an average of the measured heights, a most probable measured height is obtained. Here, an even-number-order polynomial (quartic function etc.) or a trigonometric function can also be used in place of a quadratic function, but since an improvement in accuracy in proportion to a prolonged processing time due to complex calculation cannot be expected, a quadratic function is used in the present embodiment.

Figure 4:
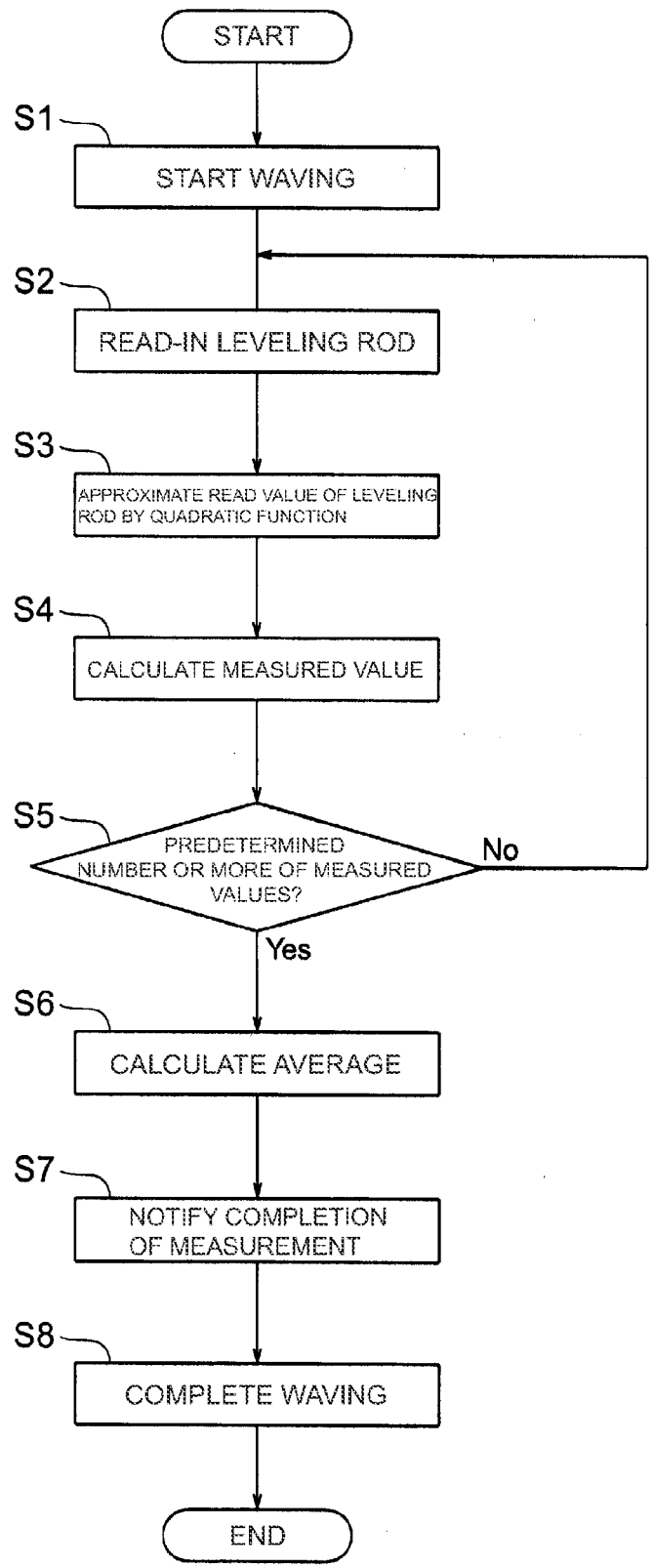
FIG. 4 is a flowchart for explaining an example of the procedure for height measurement by a waving method in an electronic level of the present invention.
Figure 5:
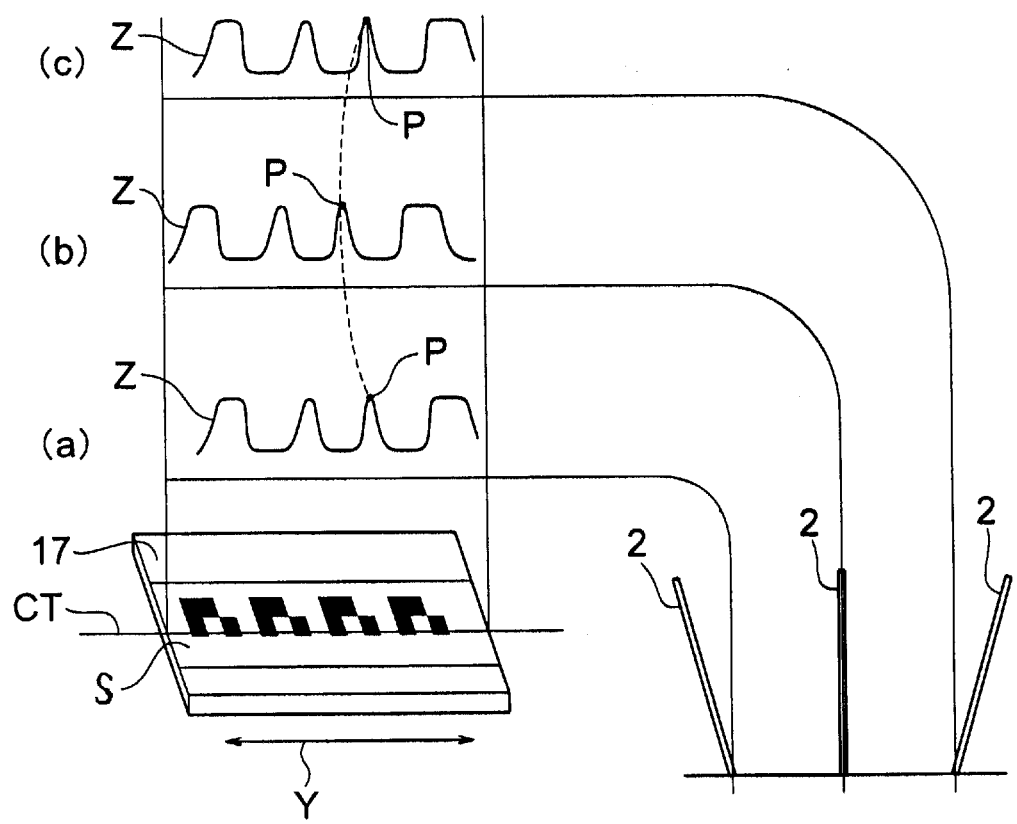
FIG. 5 is a view for explaining a conventional electronic level capable of measuring the height by a waving method.

The procedure for obtaining a most probable measured height described above will be described in greater detail based on the flowchart shown in FIG. 4.

As shown in FIG. 1, the electronic level 1 and the leveling rod 2 are set to start measurement. When the measurement is started, the procedure proceeds to step S1, in which an operator on the leveling rod 2 side starts rocking the leveling rod 2. Next, the procedure proceeds to step S2, in which the electronic level 1 reads a barcode on the leveling rod 2 a large number of times and stores read heights Lθ, and also stores the time t of reading, and determines a curve 5 of the time t and read height Lθ as shown in FIG. 3.

Then, the procedure proceeds to step S3, in which three successive appropriate points P1 (t1, L1), P2 (t2, L2), P3 (t3, L3) to be used for a calculation of measured heights are selected in terms of the vicinity 7 of the minimum value of each bottom of the curve 5, and approximated by a quadratic function. In this regard, the measured heights Lθ at times t1, t2, t3 are expressed as L1, L2, L3, respectively.

The appropriate three successive points P1, P2, P3 are selected when the following three formulas (2) to (4) are satisfied.

$$L1 > L2 \text{ and } L2 < L3 \tag{2}$$

$$L < L1 - L2 < H \tag{3}$$

$$L < L3 - L2 < H \tag{4}$$

In this regard, L represents a minimum limit of a change in the read height, and H represents a maximum limit of a change in the read height. The reason for providing the minimum limit L of a change in the read height is to distinguish between variation in the read height Lθ due to earth vibrations or atmospheric fluctuations and a change in the read height Lθ due to waving. The further the distance, the greater variation in the read height Lθ due to earth vibrations or atmospheric fluctuations, and therefore, the minimum limit L of a change in the read height is changed according to the distance.

The reason for providing the maximum limit H of a change in the read height is because, when waving is excessively fast, a leveling rod image moves on the image sensor during the light accumulation time of the image sensor, so that an accurate height measurement can no longer be performed in some cases. The higher the height on the leveling rod 2, the greater a change in the read height Lθ due to waving, and therefore, the maximum limit H of a change in the read height is changed according to the height on the leveling rod 2. Further, conditions of the following formulas (5) and (6) may be added to the above-described formulas (2) to (4) if the processing speed of the built-in CPU allows.

$$t2-t1<\Delta T \text{ and } t3-t2<\Delta t \tag{5}$$

$$|(t2-t1)-(t3-t2)|<\delta t \tag{6}$$

In this regard, $\Delta t$ is a maximum limit of a time interval of data acquisition, and $\delta t$ is a maximum limit of a change in time interval of data acquisition.

Here, when three points P1, P2, P3 in the vicinity 7 of the minimum value cannot be determined even after an elapse of a predetermined time, an alarm is issued to give an operator a warning to the effect that waving is inappropriate, or other inappropriate measuring environments exist.

When three successive appropriate points P1, P2, P3 to be used for a calculation of measured heights have been determined in step S3, the procedure proceeds to step S4, in which a curve that passes through the three points P1, P2, P3 is approximated by a quadratic function, a minimum value of the quadratic function is calculated, and the minimum value is stored as a measured height. Next, the procedure proceeds to step S5, in which whether a predetermined number or more of measured heights have been obtained is checked. When the predetermined number or more of measured heights have not been obtained, the procedure returns to step 2 to repeat steps S2 to S5 until the predetermined number or more of measured heights have been obtained.

When the predetermined number or more of measured heights have been obtained, the procedure proceeds to step S6, in which an average of measured heights is obtained excluding measured heights that can be judged to be apparently erroneous because of the values greatly different from the other measured heights, and the obtained height average is displayed as a most probable measured height. At this time, dispersion of the measured heights is also calculated, and when the dispersion is a predetermined value or more, an alarm is issued and an error display is performed, informing that the measured values are not reliable. Next, the procedure proceeds to step S7, in which an audio notification of the completion of measurement is made. Next, the procedure proceeds to step S8, in which, if there is no error display, the operator on the leveling rod 2 side stops rocking the leveling rod 2, completes the current measurement, and moves to a next measuring point. When there is an error display, measurement is performed again in terms of the same leveling rod.

This electronic level is capable of accurately measuring a height difference between two points even when a waving method is used, and is, moreover, economical with a simple modification to only slightly rewrite the program of a built-in CPU of a conventional electronic level.

However, the present invention is not limited to the embodiment described above, and various modifications can be made. For example, in the embodiment described above, the time t is stored simultaneously with read heights LA in step S2, but if read heights LA are obtained at a predetermined cycle, it is not necessary to store the time t.

REFERENCE SIGNS LIST

1 Electronic level
2 Leveling rod
Lθ Read height when leveling rod has inclination angle θ

The invention claimed is:

1. An electronic level comprising:
   leveling rod reading-in means which periodically reads the heights of graduations on a leveling rod being rocked back and forth and stores the heights read at each period,
   approximate function determining means which generates a curve formed by a polynomial function of time that approximates a plot of the read heights read in by the leveling rod reading-in means, and
   measured value calculating means which determines a minimum value of the polynomial function of time approximated by the approximate function determining means as a measured height.

2. The electronic level according to claim 1, wherein the polynomial is a quadratic function.

3. The electronic level according to claim 1, further comprising an average calculating means which obtains a plurality of measured heights and calculates an average of the measured heights.

4. The electronic level according to claim 1, comprising average determining means which calculates dispersion of the measured heights, and determines the average to be erroneous when the dispersion is a predetermined value or more.

5. An electronic level comprising:
   leveling rod reading-in means which periodically reads graduations on a leveling rod being rocked back and forth and stores heights read at each period, and stores a time of reading,
   approximate function determining means which generates a curve formed by a polynomial function of time that approximates a plot of the read heights in the vicinity of a portion of the curve including a maximum height read in by the leveling rod reading-in means, and
   measured value calculating means which determines a minimum value of the polynomial function of time approximated by the approximate function determining means as a measured height.

6. A method of operating an electronic level having a leveling rod reading-in means, an approximate function determining means, and a measured value calculating means, comprising the steps of:
   periodically reading graduations on a leveling rod being rocked back and forth and stores heights read at each period, and stores a time of reading,
   generating a curve formed by a polynomial function of time that approximates a plot of the read heights in the vicinity of a portion of the curve including a maximum height read in by the leveling rod reading-in means, and
   determining a minimum value of the polynomial function of time approximated by the approximate function determining means as a measured height.

* * * * *